United States Patent
Sakuragi et al.

(10) Patent No.: US 11,639,726 B2
(45) Date of Patent: May 2, 2023

(54) BLOWER

(71) Applicant: Makita Corporation, Anjo (JP)

(72) Inventors: Masaki Sakuragi, Anjo (JP); Atsushi Yamamoto, Anjo (JP); Shinpei Inagawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/568,897

(22) Filed: Jan. 5, 2022

(65) Prior Publication Data

US 2022/0213903 A1 Jul. 7, 2022

(30) Foreign Application Priority Data

Jan. 6, 2021 (JP) ............... JP2021-000758

(51) Int. Cl.
| | | |
|---|---|---|
| F04D 29/44 | (2006.01) | |
| F04D 29/42 | (2006.01) | |
| F04D 25/08 | (2006.01) | |
| A01G 20/47 | (2018.01) | |
| A47L 9/00 | (2006.01) | |
| F04D 29/54 | (2006.01) | |
| F04D 29/66 | (2006.01) | |
| A47L 5/24 | (2006.01) | |

(52) U.S. Cl.
CPC ........... *F04D 29/441* (2013.01); *A01G 20/47* (2018.02); *A47L 9/0081* (2013.01); *F04D 25/08* (2013.01); *F04D 29/4226* (2013.01); *F04D 29/444* (2013.01); *F04D 29/541* (2013.01); *F04D 29/542* (2013.01); *F04D 29/544* (2013.01); *F04D 29/545* (2013.01); *F04D 29/663* (2013.01); *F04D 29/667* (2013.01); *A47L 5/24* (2013.01)

(58) Field of Classification Search
CPC ..... A01G 20/47; F04D 29/441; F04D 29/444; F04D 29/541; F04D 29/542; F04D 29/543; F04D 29/545; F04D 29/663; F04D 29/666; F04D 29/544; F04D 29/667; A47L 9/0081; A47L 9/22; A47L 11/4097; A47L 5/24
USPC ........................................ 15/344, 412, 413
See application file for complete search history.

(56) References Cited

U.S. PATENT DOCUMENTS

| | | | | |
|---|---|---|---|---|
| 2006/0045774 | A1* | 3/2006 | Lu | F04D 29/545 417/423.7 |
| 2007/0116564 | A1* | 5/2007 | Hsu | F04D 29/542 415/211.2 |
| 2016/0029863 | A1* | 2/2016 | Guo | A47L 9/08 15/415.1 |
| 2018/0030999 | A1* | 2/2018 | Lee | F04D 29/38 |
| 2020/0040910 | A1* | 2/2020 | Horler | F04D 19/042 |

FOREIGN PATENT DOCUMENTS

| | | | | |
|---|---|---|---|---|
| JP | 2014-148951 A | | 8/2014 | |
| WO | WO-2017/095628 A1 | * | 6/2017 | ........... F04D 29/444 |

* cited by examiner

*Primary Examiner* — Christopher Verdier
(74) *Attorney, Agent, or Firm* — Sughrue Mion, PLLC

(57) ABSTRACT

A blower may include a fan, a casing including a discharge port and housing the fan, and a nozzle attachable to the discharge port. The nozzle may include a nozzle tube in which air flows, and a plate member disposed within the nozzle tube. A rear end surface of the plate member may be inclined to a flow direction in which air flows within the nozzle tube.

12 Claims, 11 Drawing Sheets

BLOWER

CROSS-REFERENCE TO RELATED APPLICATION

This application claims priority to Japanese Patent Application No. 2021-000758 filed on Jan. 6, 2021, the entire contents of Which are hereby incorporated by reference into the present application.

TECHNICAL FIELD

The disclosure herein relates to blowers.

BACKGROUND

Japanese Patent Application Publication No. 2014-148951 describes a blower. The blower includes a fan, a casing, and a nozzle. The easing has a discharge port and houses the fan. The nozzle is attachable to the discharge port. The nozzle includes a nozzle tube in which air flows.

SUMMARY

In the blower described above, an access prevention member including a plate member may be disposed within the nozzle tube in order to prevent a hand of an operator from reaching the easing when he/she inserts the hand from a distal end opening of the nozzle tube. However, the plate member disposed within the nozzle tube may cause noise when air flows through the nozzle tube. The present disclosure discloses techniques that can suppress noise generation when air flows through a nozzle tube.

The disclosure herein discloses a blower. The blower may comprise a fan; a casing including a discharge port and housing the fan; and a nozzle attachable to the discharge port. The nozzle may comprise a nozzle tube in which air flows; and a plate member disposed within the nozzle tube. A rear end surface of the plate member may be inclined to a flow direction in which air flows within the nozzle tube.

Air, which has entered the nozzle tube, flows around the plate member. This causes a turbulent flow. In a case where the rear end surface of the plate member is not inclined to a plane orthogonal to the flow direction, the turbulent flow may generate noise in a narrow specific frequency range. In the above-described configuration, the rear end surface of the plate member is inclined to the flow direction, and thus positions at which the turbulent flow is generated and the distribution thereof can vary with respect to the flow direction. As a result, noise generation can be suppressed.

Further, the disclosure herein discloses a blower. The blower may comprise a fan; a casing including a discharge port and housing the fan; and a nozzle attachable to the discharge port. The nozzle may comprise a nozzle tube in which air flows; and a plate member disposed within the nozzle tube. The plate member may include a slit penetrating the plate member in a flow direction in which air flows within the nozzle tube.

In a case where the plate member does not include a slit, a turbulent flow may cause noise in a narrow specific frequency range. In the above-described configuration, since the plate member includes the slit, the air flows through the slit as well as around the plate member. As compared with the case where the plate member does not include the slit, positions at which the turbulent flow is generated and the distribution thereof can vary with respect to the flow direction. As a result, noise generation can be suppressed.

DETAILED DESCRIPTION

Figure 1:
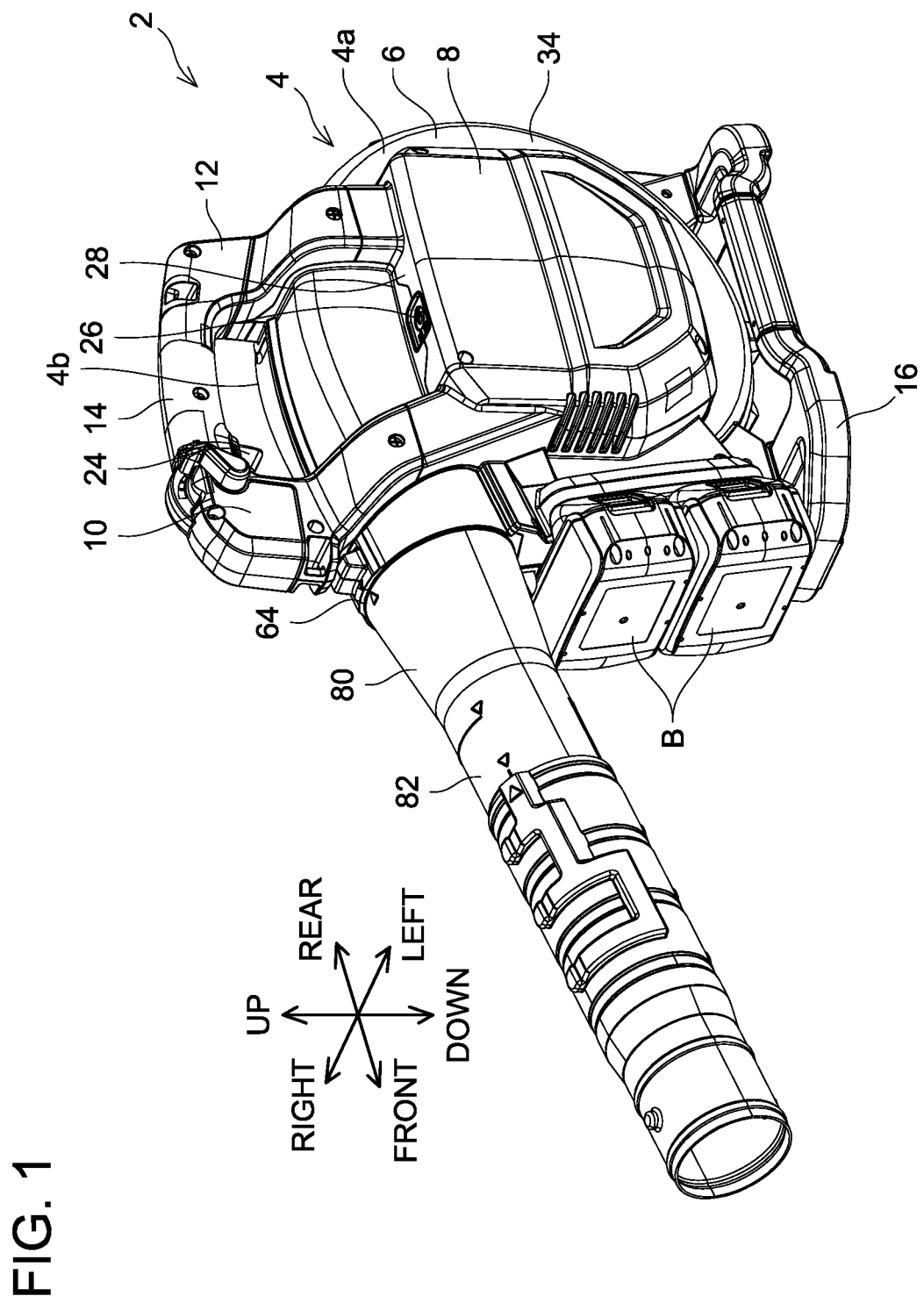
FIG. 1 is a perspective view of a blower 2 according to a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved blowers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, with respect to a radial direction of the nozzle tube, an upstream end of the rear end surface of the plate member in the flow direction may be positioned radially inward of a downstream end of the rear end surface of the plate member in the flow direction.

In the above configuration, the upstream end of the rear end surface of the plate member is positioned radially inward of the downstream end thereof, and thus positions at which a turbulent flow is generated and the distribution thereof can vary with respect to the flow direction and the radial direction of the nozzle tube. Thus, noise generation can be further suppressed.

In one or more embodiments, with respect to a radial direction of the nozzle tube, a downstream end of the rear end surface of the plate member in the flow direction may be positioned radially inward of an upstream end of the rear end surface of the plate member in the flow direction.

In the above configuration, the downstream end of the rear end surface of the plate member is positioned radially inward of the upstream end thereof, and thus positions at which a turbulent flow is generated and the distribution thereof can vary with respect to the flow direction and the radial direction of the nozzle tube. Thus, noise generation can be further suppressed.

In one or more embodiments, the rear end surface of the plate member may be inclined to the flow direction at an angle in a range from 30 degrees to 85 degrees.

If the rear end surface of the plate member is inclined to the flow direction at an angle smaller than 30 degrees, the strength of the plate member is insufficient. Further, if the rear end surface of the plate member is inclined to the flow direction at an angle larger than 85 degrees, noise generation cannot be sufficiently suppressed. The above configuration can suppress noise generation, while securing the strength of the plate member.

In one or more embodiments, the plate member may include a notch.

In the above configuration, positions at which a turbulent flow is generated and the distribution thereof are varied by the simple configuration of the plate member including the notch, and thus noise generation can be suppressed.

In one or more embodiments, the plate member may include a dimple.

In the above configuration, positions at which a turbulent flow is generated and the distribution thereof are varied by the simple configuration of the plate member including the dimple, and thus noise generation can be suppressed.

In one or more embodiments, the plate member may include a portion where a surface roughness of the portion is equal to or more than 0.1.

In a case where the plate member does not include a portion with a surface roughness of 0.1 or more, noise generation cannot be sufficiently suppressed. In the above configuration, positions at which a turbulent flow is generated and the distribution thereof vary, and thus noise generation can be suppressed.

In one or more embodiments, a width of the plate member in the flow direction may be equal to or more than 10% of an inner diameter of the nozzle tube.

In a case where the width of the plate member is smaller than 10% of the inner diameter of the nozzle tube, the strength of the plate member is insufficient. The above configuration ensures the strength of the plate member.

In one or more embodiments, as the nozzle is viewed in the flow direction, a thickness of the plate member may be in a range from 1% to 8% of an inner diameter of the nozzle tube.

If the thickness of the plate member is smaller than 1% of the inner diameter of the nozzle tube, the strength of the plate member is insufficient. Further, if the thickness of the plate member is larger than 8% of the inner diameter of the nozzle tube, a flow resistance in the nozzle tube increases.

The above configuration can ensure the strength of the plate member, while suppressing an excessive increase in the flow resistance of the nozzle tube.

First Embodiment

A blower 2 according to a first embodiment will be described with reference to FIGS. 1 to 6. The blower 2 is a hand-held blower. The blower 2 can blow off fallen leaves, etc. on the ground. Hereinafter, a direction in which a shaft 70a of a motor 70 (see FIG. 2), which will be described later, extends is referred to as a left-right direction, a direction orthogonal to the left-right direction is referred to as a front-rear direction, and a direction orthogonal to the left-right direction and the front-rear direction is referred to as an up-down direction.

Figure 2:
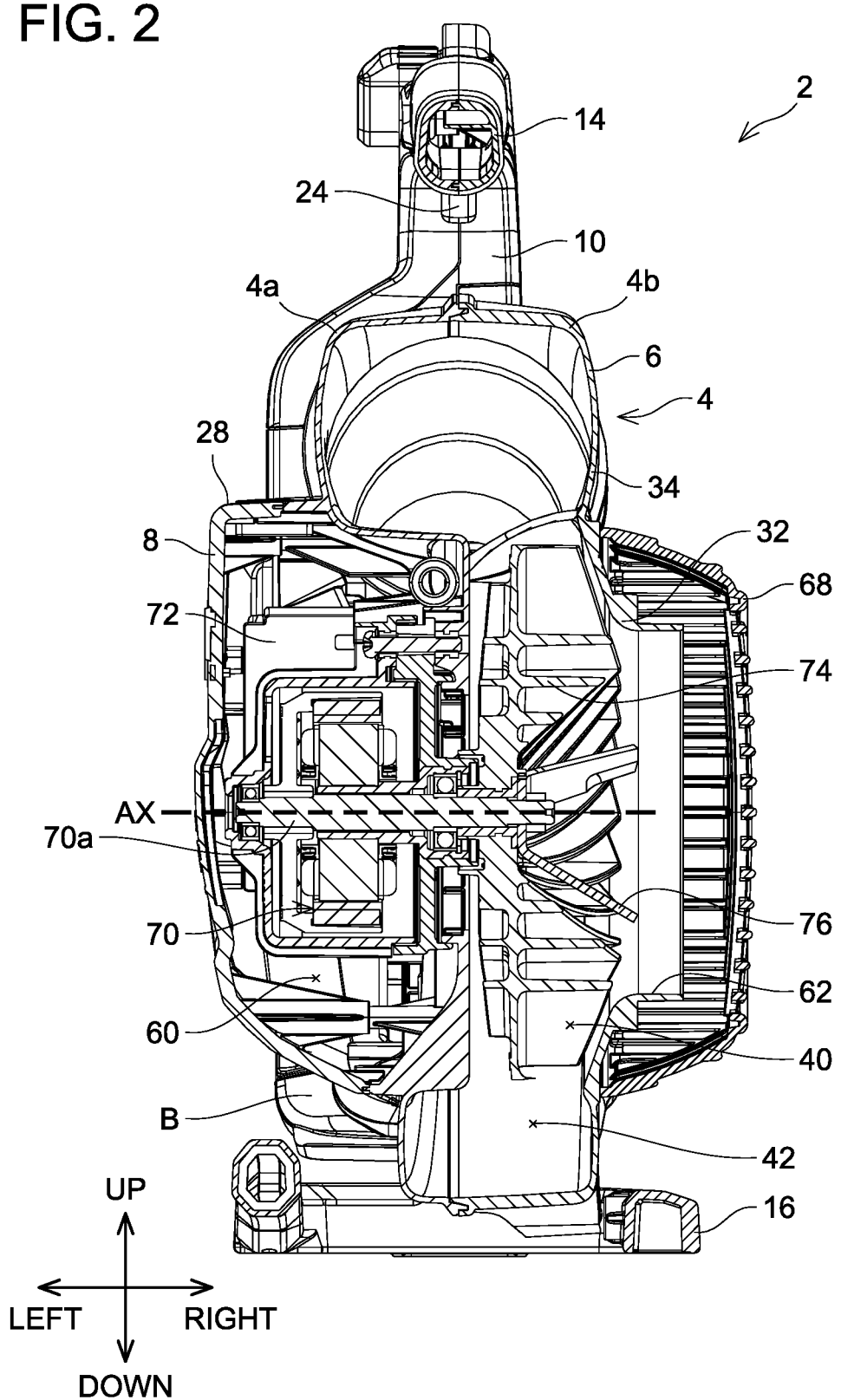
FIG. 2 is a longitudinal sectional view of the blower 2 of the first embodiment in the vicinity of a motor 70.

As illustrated in FIG. 1, the blower 2 comprises a casing 4, a leg member 16, a plurality of battery packs B (two in the present embodiment), a trigger 24, and a main power switch 26. As illustrated in FIG. 2, the casing 4 comprises a left casing 4a that defines the outer shams of the left half of the casing 4 and a right casing 4b that defines the outer shape of the right half of the casing 4.

As illustrated in FIG. 1, the casing 4 comprises a main easing 6, a side casing 8, a front connecting portion 10, a rear connecting portion 12, and a grip 14, The side casing 8 is screwed to the left side surface of the main casing 6.

The front connecting portion 10 extends upward from a front upper portion of the main casing 6. The rear connecting portion 12 extends upward from a rear upper portion of the main casing 6. The grip 14 extends from a rear upper portion of the front connecting, portion 10 to a front upper portion of the rear connecting portion 12. The grip 14 is disposed above the main casing 6. The grip 14 is grippable by an operator. The leg member 16 is fixed to a lower portion of the main casing 6. When the blower 2 is placed on the ground, only the leg member 16 contacts with the ground.

The two battery packs B are detachably attached to the front surface of the main easing 6. The two battery packs B are electrically connected in series. In a variant, the two battery packs B may be electrically connected in parallel. The battery packs B comprise, for example, lithium ion batteries.

The trigger 24 is attached to the grip 14. The trigger 24 is pushed in by a finger of the operator's hand gripping the grip 14.

The main power switch 26 is disposed on a middle surface 28. The middle surface 28 is positioned in the vicinity of the left side surface of the casing 4 and faces upward. The main power switch 26 is manipulated by the other hand of the operator than the hand gripping the grip 14. The main power switch 26 is a switch that switches between an on-state and an off-state of the blower 2. When the blower 2 is in the off-state, the rotation of the motor 70, which will be described later, is prohibited. In this case, the motor 70 does not rotate even when the trigger 24 is pushed in. On the other hand, when the blower 2 is in the on-state, the rotation of the motor 70 is permitted. In this case, the motor 70 rotates when the trigger 24 is pushed in.

Figure 3:
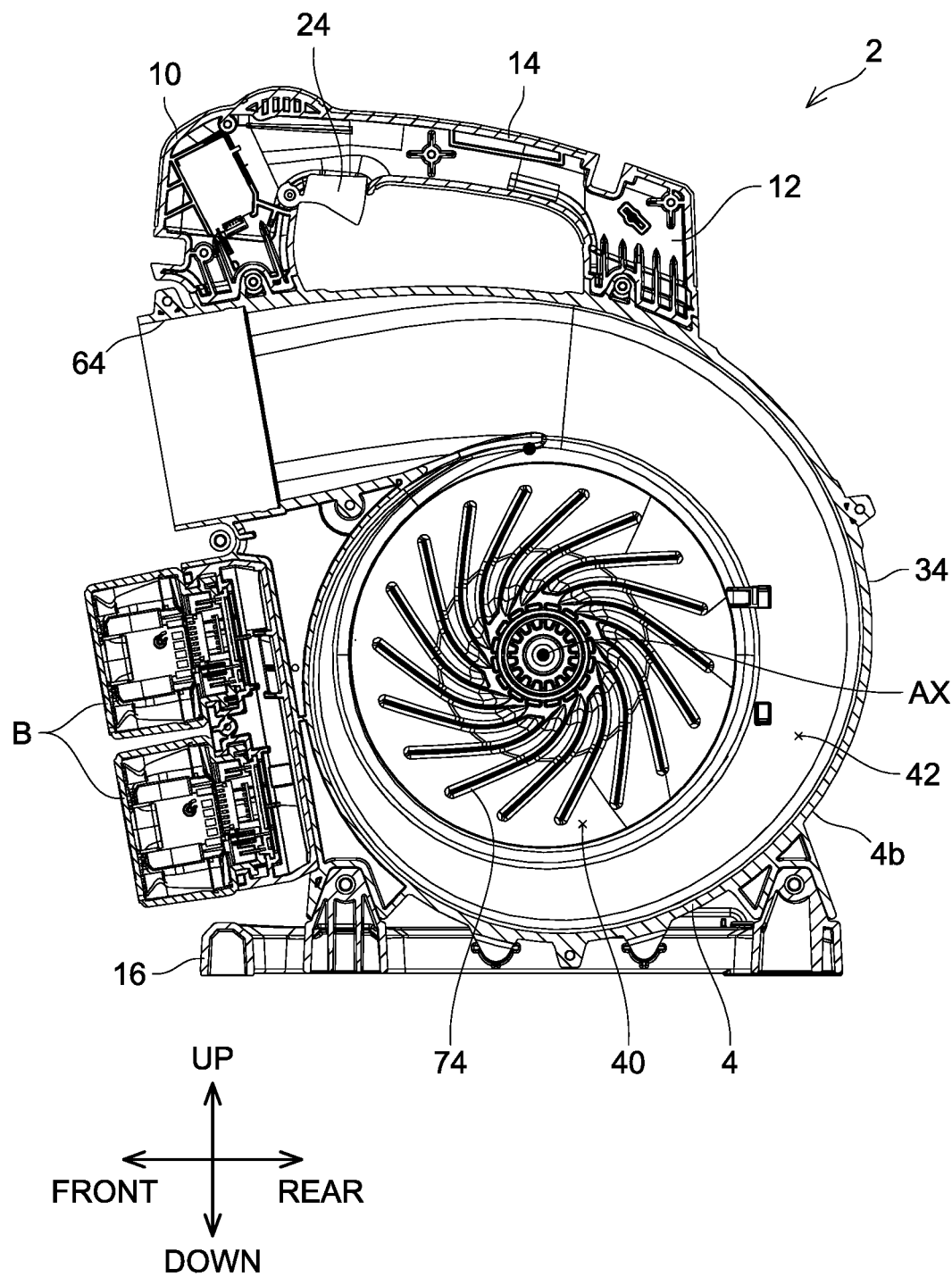
FIG. 3 is a transverse sectional view of the blower 2 of the first embodiment.

As illustrated in FIG. 2, the casing 4 comprises a housing 32 and a volute 34. The housing 32 includes a fan housing chamber 40 therein. The volute 34 is formed integrally with the housing 32. With respect to a radial direction of a central axis AX extending in the left-right direction, the volute 34 is positioned radially outward of the housing 32. As illustrated in FIG. 3, the volute 34 includes air flow passage 42 through which air flows. The air flow passage 42 is in communication with the fan housing chamber 40. The air flow passage 42 extends spirally around the central axis AX. The air flow passage 42 is in communication with the outside of the blower 2 through a discharge port 64 of the volute 34.

As illustrated in FIG. 2, the casing 4 includes a motor housing chamber 60 and an intake port 62. The motor housing chamber 60 is defined by the main casing 6 and the side casing 8. The motor housing chamber 60 is positioned on the left side of the fan housing chamber 40. The intake port 62 is positioned in the right side surface of the housing 32 in the right casing 4b. The intake port 62 penetrates the right side surface of the housing 32. The intake port 62 is in communication with the fan housing chamber 40. The intake port 62 is covered with a cover 68. A large number of small openings are formed in the cover 68.

The blower 2 further comprises the motor 70, a control board 72, a fan 74, and a blade 76. The motor 70 and the control board 72 are disposed in the motor housing chamber 60. The motor 70 is a prime mover, for example, a brushless motor. In a variant, the motor 70 may be an engine or a brushed motor. The motor 70 rotates by electric power of the two battery packs B. The control board 72 controls the rotation of the motor 70 in accordance with the manipulation on the trigger 24.

The fan 74 and the blade 76 are disposed in the fan housing chamber 40. The fan 74 is fitted in the vicinity of the right end of the shaft 70a of the motor 70. The fan 74 is a centrifugal fan. The blade 76 is fitted to the shaft 70a on the right side of the fan 74. When the motor 70 rotates, the fan 74 and the blade 76 rotate about the central axis AX. As a result, air flows through the intake port 62 and flows into the fan housing chamber 40. Foreign matters (e.g., fallen leaves, pebbles, etc.) that have entered the fan housing chamber 40 together with the air are pulverized by the blade 76. The air flowing in the fan housing chamber 40 is discharged radially outward in the radial direction of the central axis AX by the fan 74.

Figure 4:
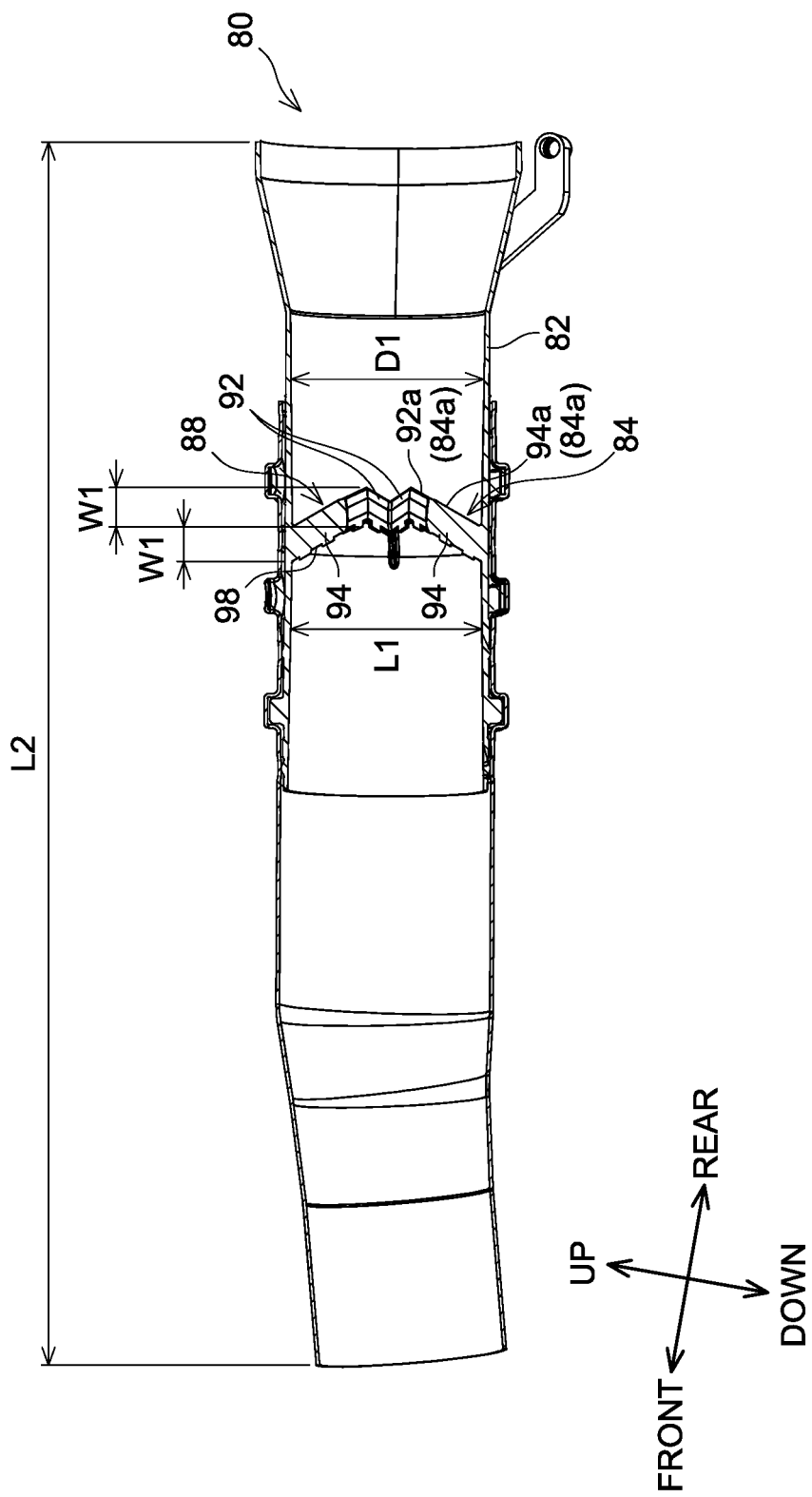
FIG. 4 is a transverse sectional view of a nozzle 80 of the first embodiment.

As illustrated in FIG. 1, a nozzle 80 is detachably attached to the discharge port 64 of the volute 34. As illustrated in FIG. 4, the nozzle 80 comprises a nozzle tube 82 and an access prevention member 84. The nozzle tube 82 has a substantially cylindrical shape extending in the longitudinal direction. Air that has flowed through the discharge port 64 flows in the nozzle tube 82. The access prevention member 84 is formed integrally with the nozzle tube 82. The access prevention member 84 is disposed within the nozzle tube 82. When the operator inserts the hand from a distal end opening of the nozzle tube 82, the access prevention member 84 prevents the operator's hand from reaching the casing 4 (see FIG. 3). The access prevention member 84 is disposed near the center of the nozzle tube 82 in the longitudinal direction of the nozzle tube 82. Further, with respect to a direction orthogonal to a flow direction in which the air flows within the nozzle tube 82 (i.e., a direction from a rear end of the access prevention member 84 toward a front end thereof), a length L1 of the access prevention member 84 is equal to an inner diameter D1 of the nozzle tube 82. The length L1 of the access prevention member 84 and the inner diameter D1 of the nozzle tube 82 are 82 mm.

Figure 5:
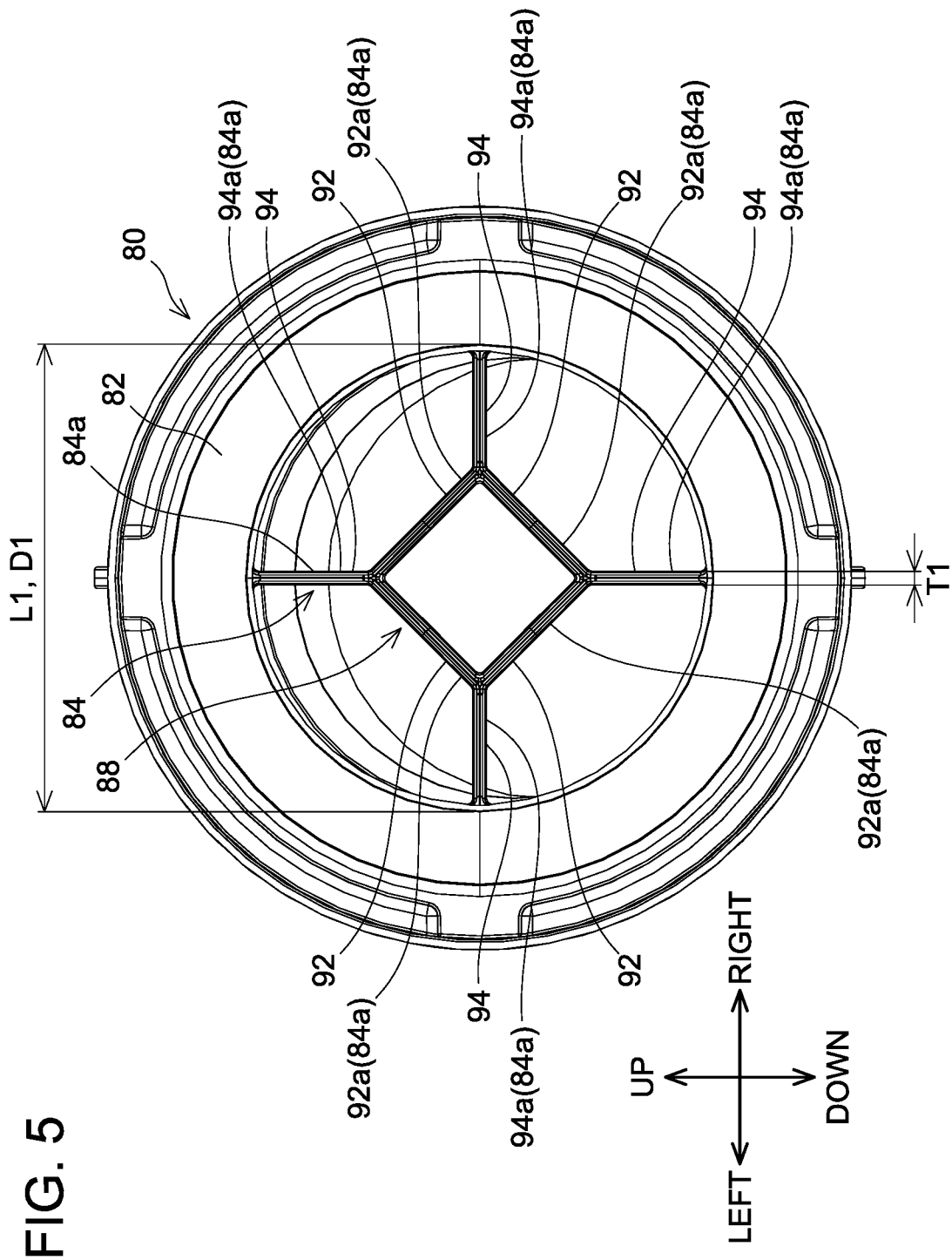
FIG. 5 is a rear view of the nozzle 80 of the first embodiment.

The access prevention member 84 comprises four center plate members 92 and four outer plate members 94. The four center plate members 92 are integrally formed with the four outer plate members 94. Side surfaces of the four center plate members 92 and side surfaces of the four outer plate members 94 are arranged along the flow direction. The four center plate members 92 are positioned radially inward of the four outer plate members 94 in the radial direction of the nozzle tube 82. As illustrated in FIG. 5, as the access prevention member 84 is viewed in the flow direction, the four center plate members 92 are connected to each other at an angle of 90 degrees. The shape of the connected four center plate members 92 is a substantially quadrangular shape. Each of the time outer plate members 94 extends from a corresponding corner of the quadrangle formed by the connected four center plate members 92 to the inner surface of the nozzle tube 82. The tour outer plate members 94 are arranged at intervals of 90 degrees with respect to a circumferential direction of the inner surface of the nozzle tube 82. The center plate members 92 and the outer plate members 94 have the same thickness T1. The thickness T1 of the center plate members 92 and the outer plate members 94 is 1 mm or more and 5 mm or less, in the present embodiment, the thickness T1 of the center plate members 92 and the outer plate members 94 is 2 mm. The thickness T1 of the center plate members 92 and the outer plate members 94 is in a range from 1% or more to 8% or less of the inner diameter D1 of the nozzle tube 82. In the present embodiment, the thickness T1 of the center plate members 92 and the outer plate members 94 is 2.5% of the inner diameter D1 of the nozzle tube 82.

As illustrated in FIG. 4, the center plate members 92 and the outer plate members 94 have the same width W1 in the flow direction. The width W1 of the center plate members 92 and the outer plate members 94 is 10 mm or more, in the present embodiment, the width W1 of the center plate members 92 and the outer plate members 94 is 15 mm. Further, the width W1 of the center plate members 92 and the outer plate members 94 is 10% or more of the inner diameter D1 of the nozzle tube 82. In the present embodiment, the width W1 of the center plate members 92 and the outer plate members 94 is 18% of the inner diameter D1 of the nozzle tube 82. In a variant, the width W1 of the center plate members 92 and the outer plate members 94 may be 20% or more of the inner diameter D1 of the nozzle tube 82.

A rear end surface 84a of the access prevention member 84 comprises rear end surfaces 92a of the center plate members 92 and rear end surfaces 94a of the outer plate members 94. The rear end surfaces 92a of the center plate members 92 and the rear end surfaces 94a of the outer plate members 94 are inclined to the flow direction. Here, being inclined to the flow direction means to form an angle larger than 0 degrees with the flow direction and form an angle larger than 0 degrees with a plane orthogonal to the flow direction. The rear end surfaces 92a of the center plate members 92 and the rear end surfaces 94a of the outer plate members 94 are not parallel to the plane orthogonal to the flow direction, thus inclined to the plane orthogonal to the flow direction.

Figure 6:
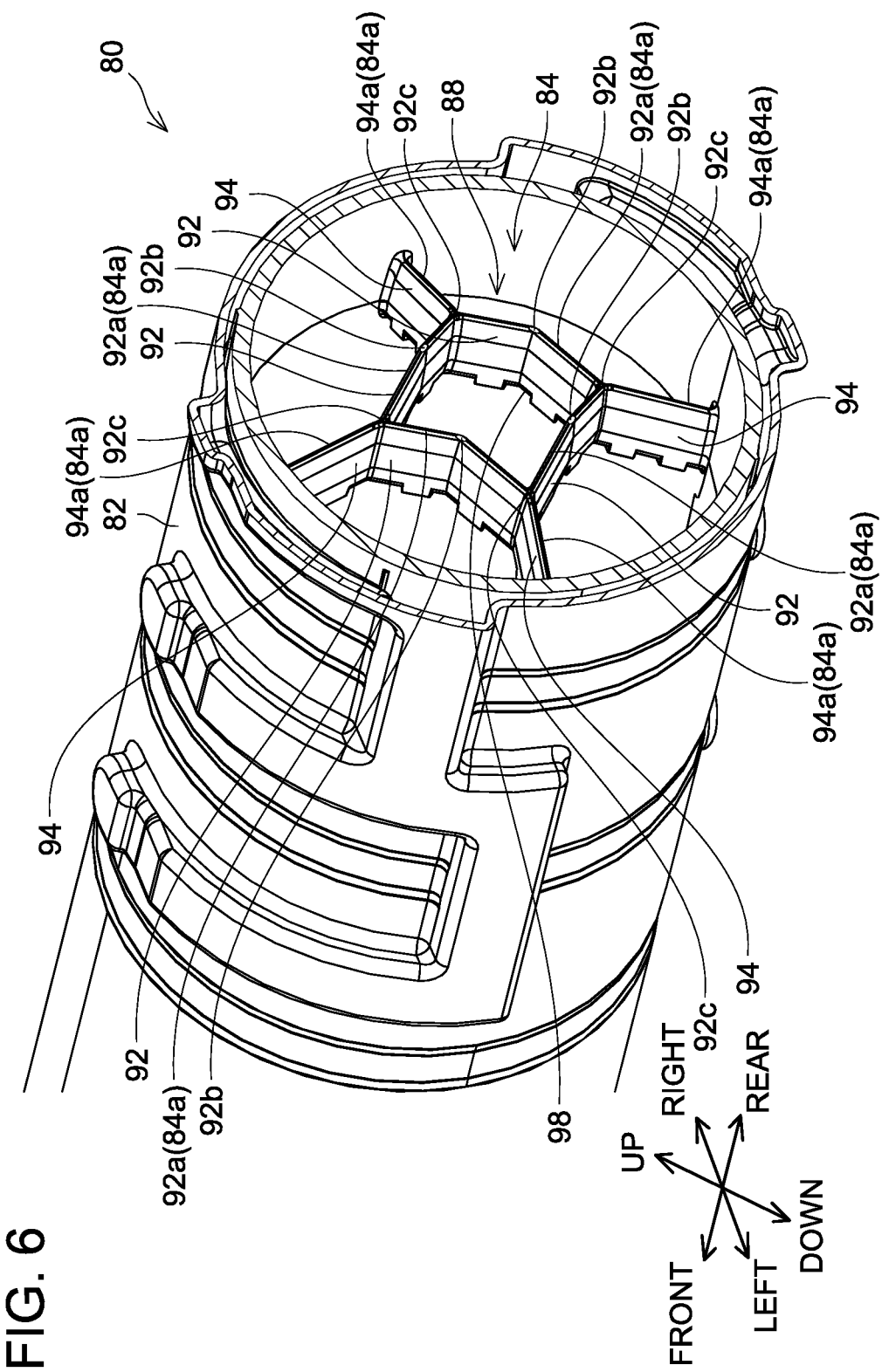
FIG. 6 is a sectional perspective view of the nozzle 80 of the first embodiment in the vicinity of a rear end surface 84a of an access prevention member 84.

As illustrated in FIG. 6, with respect to the flow direction, a center portion 92b of the rear end surface 92a of each center plate member 92 is positioned upstream of any other portions of the rear end surface 92a, and both ends 92c of the rear end surface 92a of each center plate member 92 are positioned downstream of any other portions of the rear end surface 92a. Here, each center portion 92b represents the center in the longitudinal direction of the rear end surface 92a of the center plate member 92 when the access prevention member 84 is viewed in the flow direction, and the both ends 92c represent both ends in the longitudinal direction of the rear end surface 92a of the center plate member 92 when the access prevention member 84 is viewed in the flow direction. The center portion 92b of the rear end surface 92a of each center plate member 92 is positioned inward of any other portions of the rear end surface 92a in the radial direction of the nozzle tube 82, and the both ends 92c of the rear end surface 92a of each center plate member 92 are positioned outward of any other portions of the rear end surface 92a in the radial direction of the nozzle tube 82. With respect to the radial direction of the nozzle tube 82, upstream ends of the rear end surfaces 92a of the center plate members 92 in the flow direction are positioned radially inward of (i.e., closer to the discharge port 64 than) downstream ends of the rear end surfaces 92a of the center plate members 92 in the flow direction. The rear end surfaces 92a of the center plate members 92 form a noise suppression mechanism 88. The rear end surfaces 92a of the center plate members 92 are inclined to the flow direction at an angle in a range from 30 degrees or more to 85 degrees or less (i.e., inclined to the plane orthogonal to the flow direction at an angle in a range from 5 degrees or more to 60 degrees or less). In the present embodiment, the rear end surfaces 92a of the center plate members 92 are inclined to the flow direction at an angle of 60 degrees (i.e., inclined to the plane orthogonal to the flow direction at an angle of 30 degrees). The rear end surfaces 92a of the center plate members 92 may be inclined to the flow direction at an angle in a range from 40 degrees or more to 80 degrees or less (i.e., inclined to the plane orthogonal to the flow direction at an angle in a range from 10 degrees or more to 50 degrees or less).

As illustrated in FIG. 4, with respect to the radial direction of the nozzle tube 82, upstream ends of the rear end surfaces 94a of the outer plate members 94 in the flow direction are positioned radially inward of downstream ends thereof. The rear end surfaces 94a of the outer plate members 94 form the noise suppression mechanism 88. The rear end surfaces 94a of the outer plate members 94 are inclined to the flow direction at an angle in a range from 30 degrees or less (i.e., inclined to the plane orthogonal to the flow direction by an angle in a range from 5 degrees or more to 60 degrees or less). In the present embodiment, the rear end surfaces 94a of the outer plate members 94 are inclined to the flow direction at an angle of 60 degrees inclined to the plane orthogonal to the flow direction by an angle of 30 degrees). The rear end surfaces 94a of the outer plate members 94 may be inclined to the flow direction at an angle in a range from 40 degrees or more to 80 degrees or less (i.e., inclined to the plane orthogonal to the flow direction at an angle in a range from 10 degrees or more to 50 degrees or less). In the present embodiment, the inclination angle of the rear end surfaces 94a of the outer plate members 94 is the same as the inclination angle of the tear end surfaces 92a of the center plate members 92. In a variant, the inclination angle of the rear end surfaces 94a of the outer plate members 94 may be different from the inclination angle of the rear end surfaces 92a of the center plate members 92.

A plurality of notches 98 is formed at front ends of the center plate members 92 and front ends of the outer plate members 94. Each notch 98 is recessed rearward from the front end of the center plate member 92 or the front end of the outer plate member 94. The notches 98 form the noise suppression mechanism 88.

A surface roughness Ra of the rear end surfaces 92a of the center plate members 92 and the rear end surfaces 94a of the outer plate member's 94 is 0.1 or more in the present embodiment, the surface roughness Ra of the rear end surfaces 92a of the center plate members 92 and the rear end surfaces 94a of the outer plate members 94 is 0.1. The surface roughness Ra represents arithmetic average roughness. In a variant, the surface roughness Ra of the rear end surfaces 92a of the center plate members 92 and the rear end surfaces 94a of the outer plate members 94 may be in a range from 0.2 or more to 8 or less, in the present embodiment, the access prevention member 84 including the center plate members 92 and the outer plate members 94 is formed by die molding and the surface roughness Ra of the rear end surfaces 92a of the center plate members 92 and the rear end surfaces 94a of the outer plate members 94 is adjusted by an embossed pattern on the inner surface of the molding die. In a variant, the surface roughness Ra of the rear end surfaces 92a of the center plate members 92 and the rear end surfaces 94a of the outer plate members 94 may be adjusted, for example, by sandblasting or filing the rear end surfaces 92a of the center plate members 92 and the rear end surfaces 94a of the outer plate members 94. In the present embodiment, portions of the center plate members 92 and the outer plate members 94 where the surface roughness Ra is 0.1 form the noise suppression mechanism 88. In a variant, the noise suppression mechanism 88 may include portions of the center plate members 92 and the outer plate members 94 where the surface roughness Ra is 0.1 or more, or may include portions thereof where the surface roughness Ra is in the range from 0.2 or more to 8 or less.

Next, a blowing operation of the blower 2 will be described. As illustrated in FIG. 2, when the grip 14 is gripped by the operator and the trigger 24 is pushed in by the operator to rotate the motor 70, the fan 74 rotates about the shaft 70a. As a result, air flows into the fan housing chamber 40 through the intake port 62. The air, which has flowed into the fan housing chamber 40, is discharged outward in the radial direction of the central axis AX by the fan 74 and flows through the air flow passage 42. As illustrated in FIG. 3, the air in the air flow passage 42 flows toward the discharge port 64 and then flows into the nozzle tube 82. As illustrated in FIG. 4, the air, which has flowed into the nozzle tube 82, flows around the access prevention member 84. Since the upstream ends of the rear end surfaces 92a of the center plate members 92 and the rear end surfaces 94a of the outer plate members 94 are positioned radially inward of the downstream ends thereof with respect to the radial direction of the nozzle tube 82, positions at which a turbulent flow is generated and the distribution thereof vary with respect to the flow direction and the radial direction of the nozzle tube 82. In addition, a turbulent flow is caused by the air flowing along the notches 98 formed at the front ends of the center plate members 92 and the front ends of the outer plate members 94. As a result, even when the air flows in the nozzle tube 82 within the set flow rate of the blower 2, noise generation is suppressed. The air, which has flowed around the access prevention member 84, is blown out from the distal end opening of the nozzle tube 82.

(Effects)

In the present embodiment, the blower 2 comprises the fan 74, the casing 4 including the discharge port 64 and housing the fan 74, and the nozzle 80 attachable to the discharge port 64. As shown in FIG. 4, the nozzle 80 comprises the nozzle tube 82 in which air flows and the plate members 92, 94 disposed within the nozzle tube 82. The rear end surfaces 92a, 94a of the plate members 92, 94 are inclined to the flow direction in which air flows within the nozzle tube 82.

Air, which has entered the nozzle tube 82, flows around the plate members 92, 94. This causes a turbulent flow. In a case where the rear end surface of the plate member is not inclined to a plane orthogonal to the flow direction, the turbulent flow may generate noise in a narrow specific frequency range. In the above-described configuration, the rear end surfaces 92a, 94a of the plate members 92,94 are inclined to the flow direction, and thus positions at which the turbulent flow is generated and the distribution thereof can vary with respect to the flow direction. As a result, noise generation can be suppressed.

With respect to the radial direction of the nozzle tube 82, the upstream ends of the rear end surfaces 92a, 94a of the plate members 92, 94 in the flow direction are positioned radially inward of the downstream ends of the rear end surfaces 92a, 94a of the plate members 92, 94 in the flow direction.

In the above configuration, the upstream ends of the rear end surface 92a, 94a of the plate members 92, 94 are positioned radially inward of the downstream end thereof, and thus positions at which a turbulent flow is generated and the distribution thereof can vary with respect to the flow direction and the radial direction of the nozzle tube 82. Thus, noise generation can be further suppressed.

The rear end surfaces 92a, 94a of the plate members 92, 94 are inclined to the flow direction at an angle in the range from 30 degrees to 85 degrees.

If the rear end surfaces 92a, 94a of the plate members 92, 94 are inclined to the flow direction at an angle smaller than 30 degrees, the strength of the plate members 92, 94 is insufficient. Further, if the rear end surfaces 92a, 94a of the plate members 92, 94 are inclined to the flow direction at an angle larger than 85 degrees, noise generation cannot be sufficiently suppressed. The above configuration can suppress noise generation, while securing the strength of the plate members 92, 94.

The plate members 92, 94 include the notches 98.

In the above configuration, positions at which a turbulent flow is generated and the distribution thereof are varied by the simple configuration of the plate members 92, 94 including the notch, and thus noise generation can be suppressed.

The plate members 92, 94 each include a portion where the surface roughness of the portion is equal to or more than 0.1.

In a case where the plate members 92, 94 do not include a portion with a surface roughness of 0.1 or more, noise generation cannot be sufficiently suppressed. In the above configuration, positions at which a turbulent flow is generated and the distribution thereof vary, and thus noise generation can be suppressed.

The width W1 of the plate members 92, 94 in the flow direction is equal to or more than 10% of the inner diameter D1 of the nozzle tube 82.

In a case where the width W1 of the plate members 92, 94 is smaller than 10% of the inner diameter D1 of the nozzle tube 82, the strength of the plate members 92, 94 is insufficient. The above configuration ensures the strength of the plate members 92, 94.

As the nozzle 80 is viewed in the flow direction, the thickness T1 of the plate members 92, 94 is in the range from 1% to 8% of the inner diameter D1 of the nozzle tube 82.

If the thickness T1 of the date members 92, 94 is smaller than 1% of the inner diameter D1 of the nozzle tube 82, the strength of the plate members 92, 94 is insufficient. Further, if the thickness T1 of the plate members 92, 94 is larger than 8% of the inner diameter D1 of the nozzle tube 82, a flow resistance in the nozzle tube 82 increases. The above configuration can ensure the strength of the plate members 92, 94, while suppressing an excessive increase in the flow resistance of the nozzle tube 82.

(Correspondence)

The center plate members 92 and the outer plate members 94 are examples of the "plate member".

Second Embodiment

Figure 7:
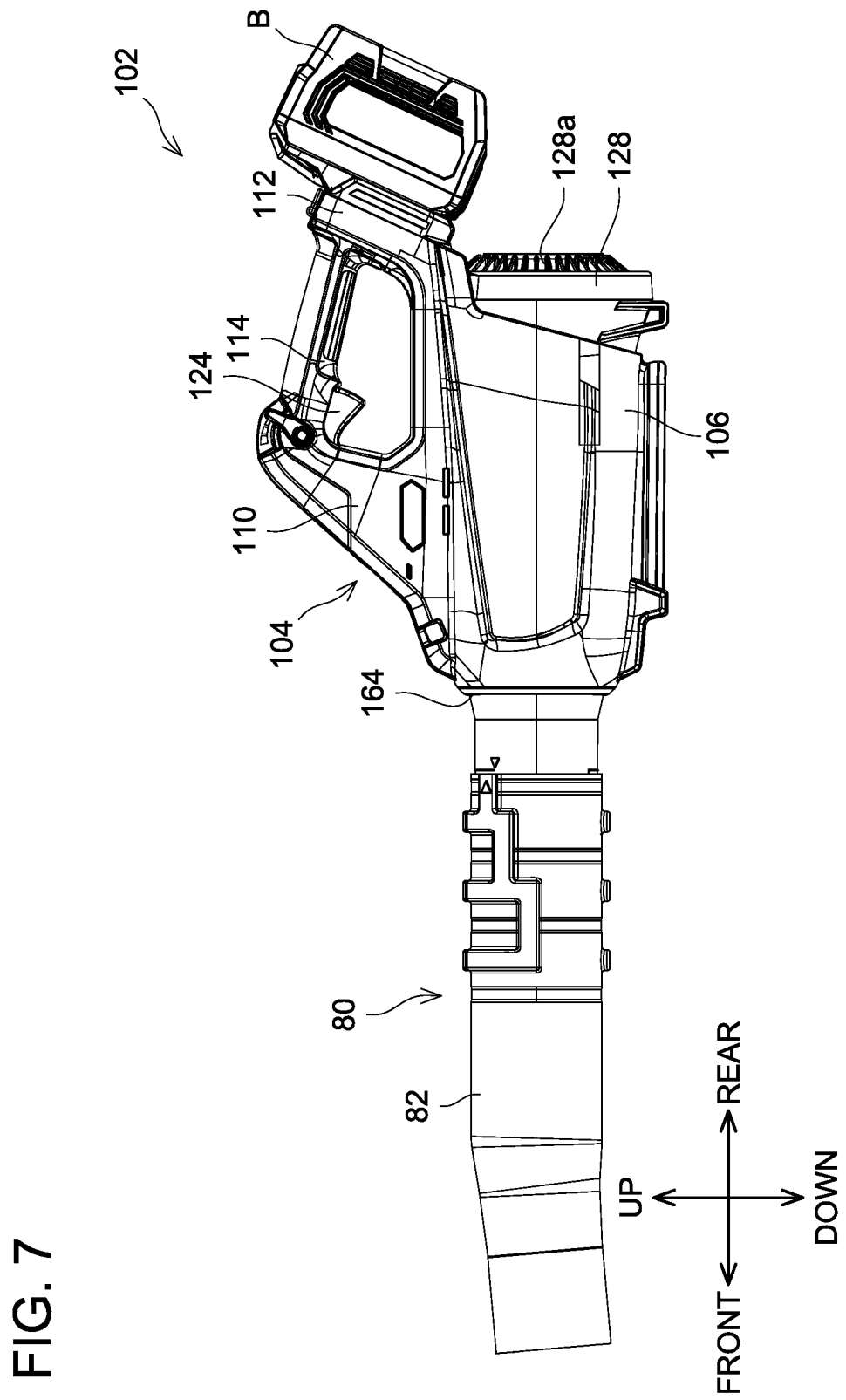
FIG. 7 is a perspective view of a blower 102 of a second embodiment.

A second embodiment will be described with reference to FIGS. 7 and 8. In the second embodiment, differences from the first embodiment will be described, and the same elements as those of the first embodiment will be denoted by the same reference numerals and description thereof will be omitted. The nozzle 80 described in the first embodiment can be applied to a blower 102 of the present embodiment. Hereinafter, the configuration of the blower 102 excluding the nozzle 80 will be described. As illustrated in FIG. 7, the blower 102 comprises a casing 104 and a trigger 124. The casing 104 includes a main casing 106, a front connecting portion 110, a rear connecting portion 112, and a grip 114. A rear end opening of the main casing 106 is covered with a cover member 128. The cover member 128 has a plurality of intake ports 128a. The plurality of intake ports 128a penetrates the cover member 128 in a thickness direction thereof. A discharge port 164 is formed in a front end of the main casing 106. The nozzle 80 is attached to the discharge port 164. The front connecting portion 110 extends upward from a front upper portion of the main casing 106. The rear connecting portion 112 extends upward from a rear upper portion of the main casing 106. A battery pack B is detachably attached to the rear connecting portion 112. The grip 114 extends from a rear upper portion of the front connecting portion 110 to a front upper portion of the rear connecting portion 112. The trigger 124 is attached to the grip 114.

Figure 8:
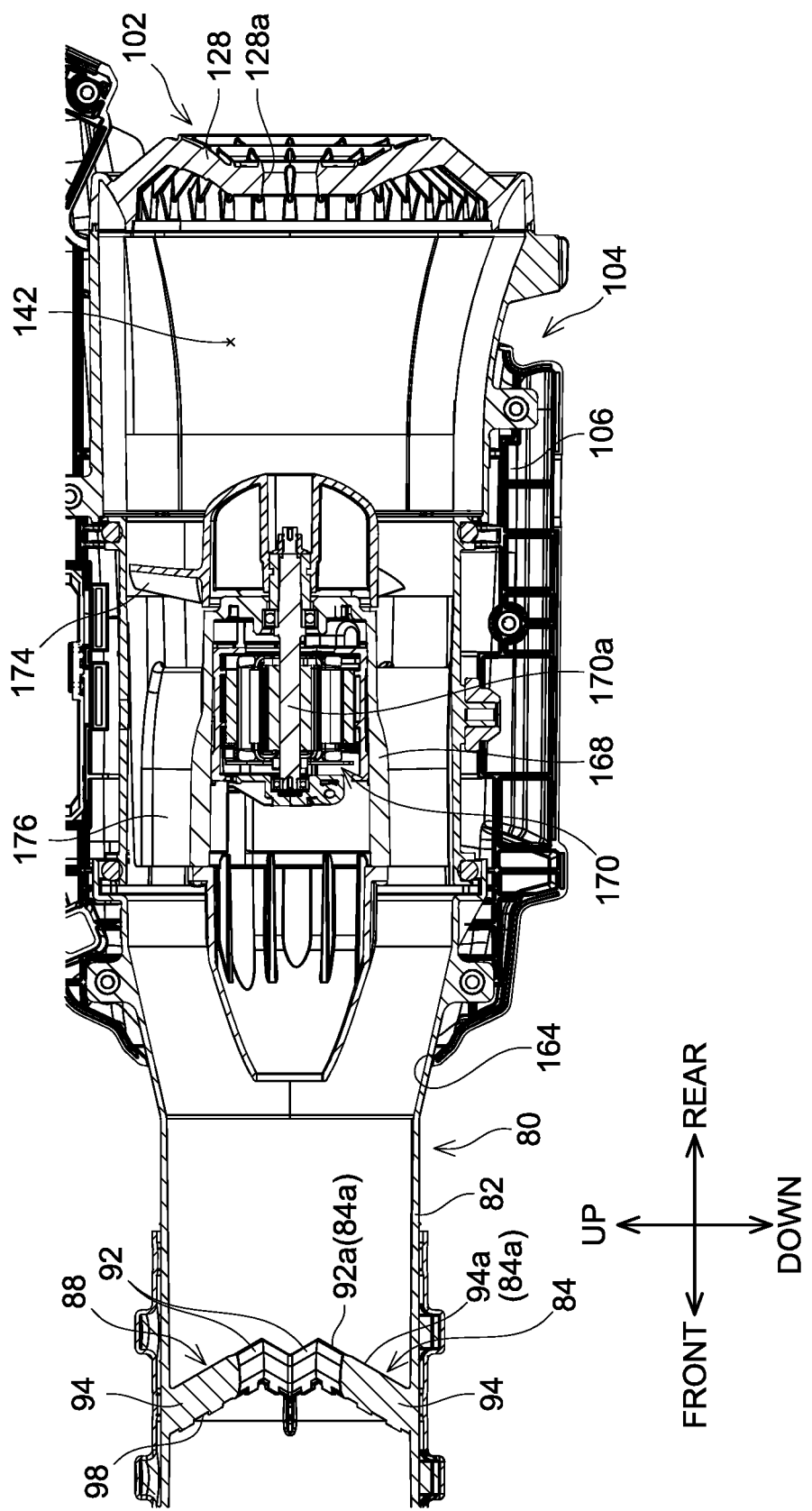
FIG. 8 is a sectional view of the blower 102 of the second embodiment.

As illustrated in FIG. 8, the blower 102 comprises a motor housing 168, a motor 170, a fan 174, and a stator vane 176. The motor housing 168, the motor 170, the fan 174, and the stator vane 176 are disposed inside the main casing 106. The motor housing 168 is fixed to the main casing 106. The motor 170 is disposed inside the motor housing 168. The motor 170 has the same configuration as the motor 70 of the first embodiment. A rear end of a shaft 170a of the motor 170 protrudes rearward from a rear end of the motor housing 168. The fan 174 is fitted to the rear end of the shaft 170a. The fan 174 is an axial fan. When the shaft 170a rotates, the fan 174 rotates. By the fan 174 pumping air from the rear side toward the front side, air flows through an air flow passage 142 formed inside the main casing 106 from the rear end opening toward the discharge port 164.

The stator vane 176 is disposed downstream of the fan 174 in the flow direction of the air and upstream of the access prevention member 84 in the flow direction. The stator vane 176 is formed separately from the access prevention member 84. The stator vane 176 is disposed closer to the fan 174 than the access prevention member 84 in the flow direction. Although not illustrated, the stator vane 176 includes a plurality of fins, and the fins are arranged at equal intervals circumferentially along an outer surface of the motor housing 168. The stator vane 176 corrects the flow of air pumped by the fan 174. Thus, an air flow that has been corrected by the stator vane 176 flows inside the nozzle tube 82 of the nozzle 80.

Third Embodiment

Figure 9:
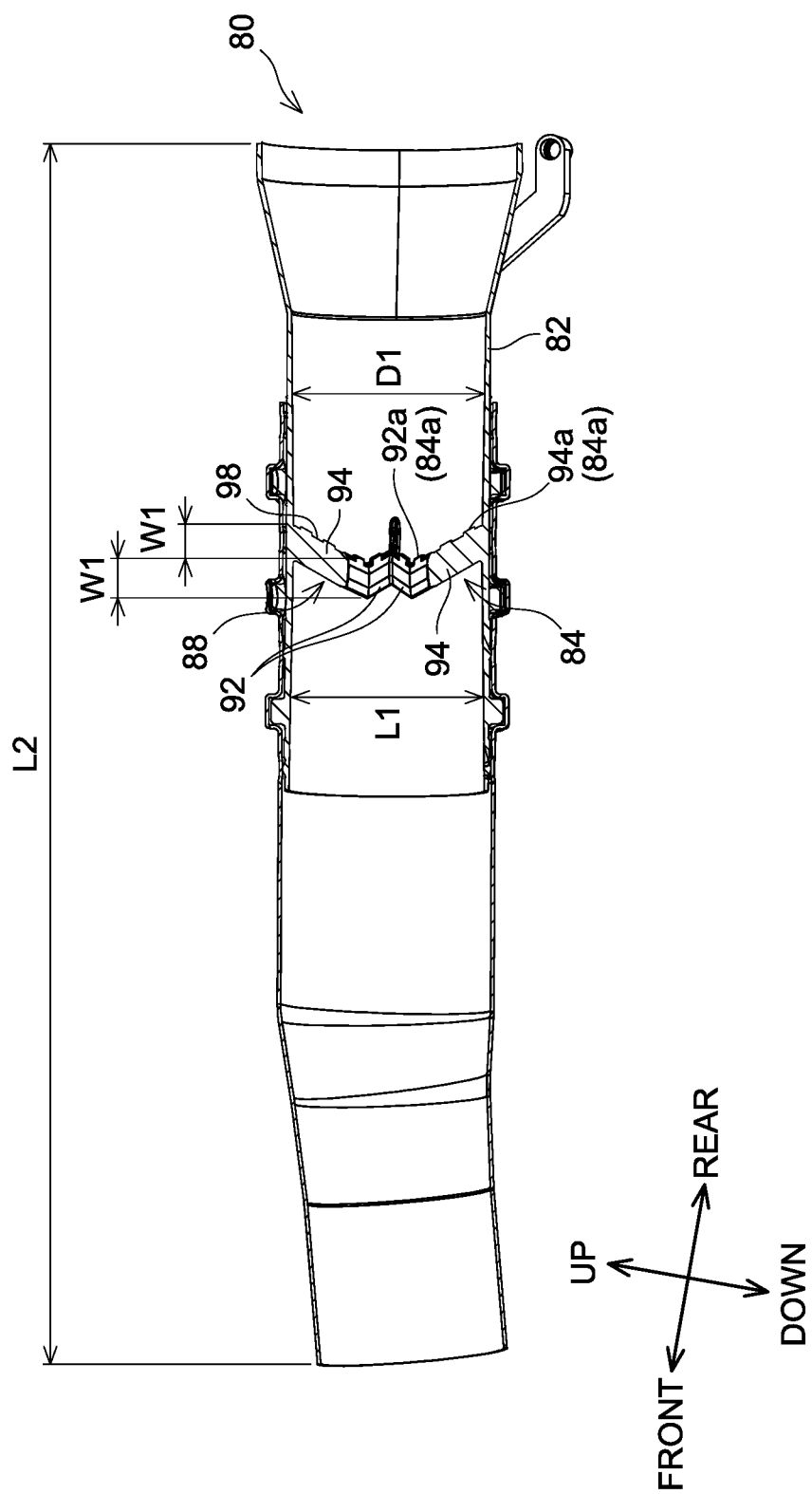
FIG. 9 is a transverse sectional view of a nozzle 80 of a third embodiment.

A third embodiment will be described with reference to FIG. 9. In the third embodiment, differences from the first embodiment will be described, and the same elements as those of the first embodiment will be denoted by the same reference numerals and description thereof will be omitted. In the third embodiment, the direction of inclination of the rear end surfaces 92a of the center plate members 92 is different from that of the rear end surfaces 92a of the center plate members 92 in the first embodiment, and the direction of inclination of the rear end surfaces 94a of the outer plate members 94 is different from that of the rear end surfaces 94a of the outer plate members 94 in the first embodiment. The central portion of the rear end surface 92a of each center plate member 92 is positioned downstream of any other portions of rear end surface 92a, and both ends of the rear end surface 92a of each center plate member 92 are positioned upstream of any other portions of the rear end surface 92a. With respect to the radial direction of the nozzle tube 82, the downstream ends of the rear end surfaces 92a of the center plate members 92 in the flow direction are positioned radially inward of the upstream ends thereof in the flow direction. The rear end surfaces 92a of the center plate members 92 are inclined to the flow direction at an angle in a range from 30 degrees or more to 85 degrees or less (i.e., inclined to the plane orthogonal to the flow direction by an angle in a range from 5 degrees or more to 60 degrees or less). In the present embodiment, the rear end surfaces 92a of the center plate members 92 are inclined to the flow direction at an angle of 60 degrees (i.e., inclined to the plane orthogonal to the flow direction at an angle of 30 degrees). The rear end surfaces 92a of the center plate members 92 may be inclined to the flow direction at an angle in a range from 40 degrees or more to 80 degrees or less (i.e., inclined to the plane orthogonal to the flow direction at an angle in a range from 10 degrees or more to 50 degrees or less).

With respect to the radial direction of the nozzle tube 82, the downstream ends of the rear end surfaces 94a of the outer plate members 94 in the flow direction are positioned radially inward of the upstream ends thereof in the flow direction. The rear end surfaces 94a of the outer plate members 94 are inclined to the flow direction at an angle in a range from 30 degrees or more to 85 degrees or less inclined to the plane orthogonal to the flow direction at an angle in a range from 5 degrees or more to 60 degrees or less). In the present embodiment, the rear end surfaces 94a of the outer plate members 94 are inclined to the flow direction at an angle of 60 degrees (i.e., inclined to the plane orthogonal to the flow direction at an angle of 30 degrees). The rear end surfaces 94a of the outer plate members 94 may be inclined to the flow direction at an angle in a range from 40 degrees or more to 80 degrees or less (i.e., inclined to the plane orthogonal to the flow direction at an angle in a range of 10 degrees or more to 50 degrees or less). The notches 98 are firmed at the rear end surfaces 92a of the center plate members 92 and the rear end surfaces 94a of the outer plate members 94.

In the present embodiment, with respect to the radial direction of the nozzle tube 82, the downstream ends of the rear end surfaces 92a, 94a of the plate members 92, 94 in the flow direction are positioned radially inward of the upstream ends of the rear end surfaces 92a, 94a of the plate members 92, 94 in the flow direction.

In the above configuration, the downstream ends of the rear end surfaces 92a, 94a of the plate members 92, 94 are positioned radially inward of the upstream end thereof, and thus positions at which a turbulent flow is generated and the distribution thereof can vary with respect to the flow direction and the radial direction of the nozzle tribe 82. Thus, noise generation can be further suppressed.

Fourth Embodiment

Figure 10:
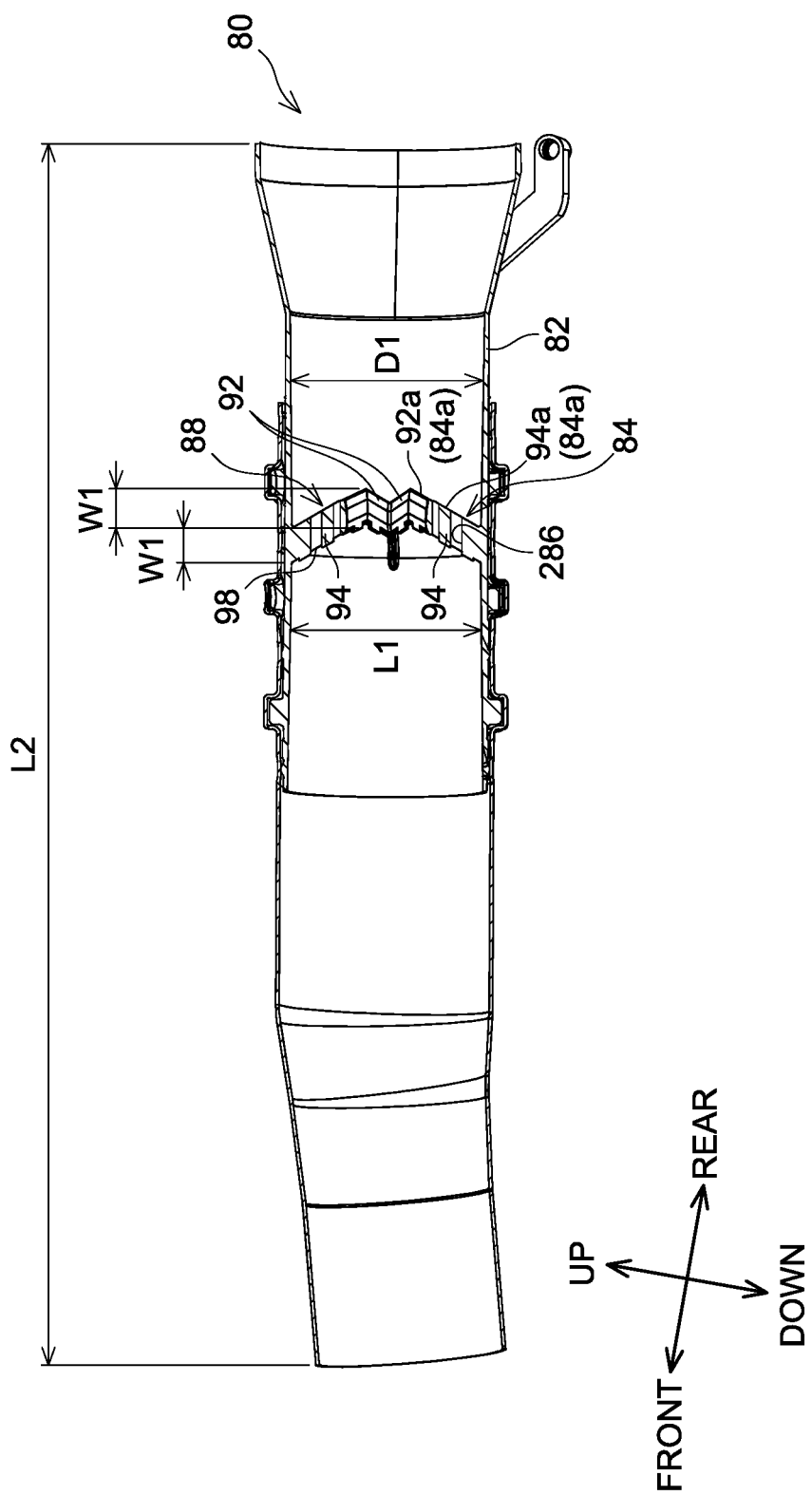
FIG. 10 is a transverse sectional view of a nozzle 80 of a fourth embodiment.

A fourth embodiment will be described with reference to FIG. 10. In the fourth embodiment, differences from the first embodiment will be described, and the same elements as those of the first embodiment will be denoted by the same reference numerals and description thereof will be omitted. In the fourth embodiment, the access prevention member 84 further includes a plurality of slits 286. The slits 286 are formed in both the center plate members 92 and the outer plate members 94. The slits 286 penetrate the center plate members 92 from the rear end surfaces 92a of the center plate members 92 toward the front ends thereof (i.e., in the flow direction). Further, the slits 286 penetrate the outer plate members 94 from the rear end surfaces 94a of the outer plate members 94 toward the front ends thereof (i.e., in the flow direction). The slits 286 extend parallel to the flow direction. In a variant, the slits 286 may extend to be inclined to the flow direction. When air flows inside the nozzle tube 82, the air can flow through the slits 286.

In the present embodiment, the blower 2 comprises the fan 74, the casing 4 including the discharge port 64 and housing the fan 74, and the nozzle 80 attachable to the discharge port 64. The nozzle 80 comprises the nozzle tube 82 in which air flows, and the plate members 92, 94 disposed within the nozzle tube 82. The plate members 92, 94 include the slits 286 penetrating the plate members 92, 94 in the flow direction in which air flows within the nozzle tube 82.

In a case where the plate members 92, 94 do not include a slit 286, a turbulent flow may cause noise in a narrow specific frequency range. In the above-described configuration, since the plate members 92, 94 include the slits 286, the air flows through the slits 286 as well as around the plate members 92, 94. As compared with the case where the plate members 92, 94 do not include the slit 286, positions at which the turbulent flow is generated and the distribution thereof can vary with respect to the flow direction. As a result, noise generation can be suppressed.

Variant of Fourth Embodiment

In a variant of the fourth embodiment, the rear end surfaces 92a of the center plate members 92 and the rear end surfaces 94a of the outer plate members 94 are nut inclined. That is, the rear end surfaces 92a of the center plate embers 92 and the rear end surfaces 94a of the outer plate members 94 are parallel to the plane orthogonal to the flow direction.

Fifth Embodiment

Figure 11:
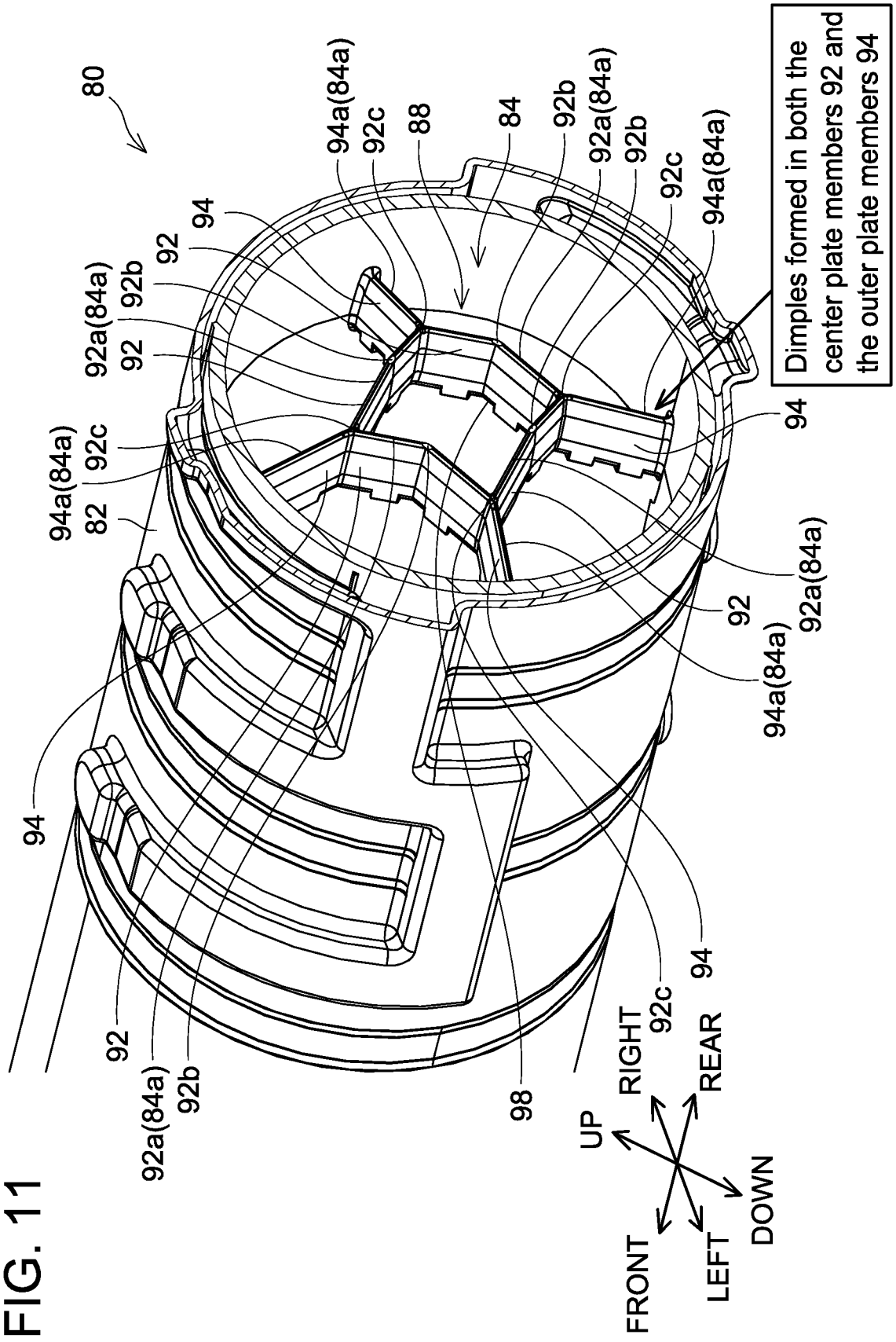
FIG. 11 is a sectional perspective view of the nozzle 80 in another embodiment.

A fifth embodiment will be described. In the fifth embodiment, differences from the first embodiment will be described, and the same elements as those of the first embodiment will be denoted by the same reference numerals and description thereof will be omitted. In the fifth embodiment, as illustrated in FIG. 11, the access prevention member 84 includes dimples instead of the notches 98. The dimples are formed in both the center plate members 92 and the outer plate members 94. The dimples are positioned near the front ends of the center plate members 92 and near the front ends of the outer plate members 94. The dimples are recessed from the side surfaces of the center plate members 92 and the side surfaces of the outer plate members 94.

In the present embodiment, the plate members 92, 94 include dimples.

In the above configuration, positions at winch a turbulent flow is generated and the distribution thereof are varied by the simple configuration of the plate members 92, 94 including the dimples, and thus noise generation can be suppressed.

In one embodiment, the notches 98 may not be formed in the access prevention member 84. Further, the dimples may not be formed in the access prevention member 84.

In one embodiment, the access prevention member 84 may not include a portion having the surface roughness Ra of 0.1 or more. The surface roughness Ra of the entire access prevention member 84 may be 0.1 or more.

In one embodiment, the number of the center plate members 92 is not limited to tour, and may be three or less, or five or more. In one embodiment, the number of the outer plate members 94 is not limited to four, and may be three or less, or five or more.

In one embodiment, the access prevention member 84 may include only the outer plate members 94. In this case, when the outer plate members 94 are viewed in the flow direction, each outer plate member 94 may extend from the corresponding first position on the inner surface of the nozzle tube 82 to the corresponding second position on the inner surface of the nozzle tube 82. Each first position is spaced apart from the corresponding second position by 180 degrees in the circumferential direction of the inner surface of the nozzle tube 82. The rear end surfaces 94a of the outer plate members 94 may be inclined to the flow direction at a constant angle. With respect to the flow direction, second position-side ends of the rear end surfaces 94a of the outer plate members 94 may be positioned upstream of first position-side ends thereof. With respect to the new direction, the second position-side ends of the rear end surfaces 94a of the outer plate members 94 may be positioned on downstream of the first position-side ends thereof.

What is claimed is:

1. A blower comprising:
   a fan;
   a casing including a discharge port and housing the fan; and
   a nozzle attachable to the discharge port,
   wherein
   the nozzle comprises:
      a nozzle tube in which air flows; and
      a plate member disposed within the nozzle tube,
      a rear end surface of the plate member is inclined to a flow direction in which air flows within the nozzle tube, and
   as the nozzle is viewed in the flow direction, a thickness of the plate member is in a range from 1% to 8% of an inner diameter of the nozzle tube.

2. The blower according to claim 1, wherein with respect to a radial direction of the nozzle tube, an upstream end of the rear end surface of the plate member in the flow direction is positioned radially inward of a downstream end of the rear end surface of the plate member in the flow direction.

3. The blower according to claim 1, wherein with respect to a radial direction of the nozzle tube, a downstream end of the rear end surface of the plate member in the flow direction is positioned radially inward of an upstream end of the rear end surface of the plate member in the flow direction.

4. The blower according to claim 1, wherein the rear end surface of the plate member is inclined to the flow direction at an angle in a range from 30 degrees to 85 degrees.

5. The blower according to claim 1, wherein the plate member includes a slit penetrating the plate member in the flow direction.

6. The blower according to claim 1, wherein the plate member includes a notch.

7. The blower according to claim 1, wherein the plate member includes a dimple.

8. The blower according to claim 1, wherein a width of the plate member in the flow direction is equal to or more than 10% of the inner diameter of the nozzle tube.

9. A blower comprising:
   a fan;
   a casing including a discharge port and housing the fan; and
   a nozzle attachable to the discharge port,
   wherein
   the nozzle comprises:
      a nozzle tube in which air flows; and
      a plate member disposed within the nozzle tube, and
      the plate member includes a slit penetrating the plate member in a flow direction in which air flows within the nozzle tube, and
   as the nozzle is viewed in the flow direction, a thickness of the plate member is in a range from 1% to 8% of an inner diameter of the nozzle tube.

10. The blower according to claim 9, wherein the plate member includes a notch.

11. The blower according to claim 9, wherein the plate member includes a dimple.

12. The blower according to claim 9, wherein a width of the plate member in the flow direction is equal to or more than 10% of the inner diameter of the nozzle tube.

* * * * *